United States Patent [19]

Karimine et al.

[11] Patent Number: 5,175,405
[45] Date of Patent: Dec. 29, 1992

[54] METHOD OF AUTOMATICALLY WELDING RAILS

[75] Inventors: Kenichi Karimine; Makoto Okumura; Koichi Shinada; Nobuyuki Aoki; Kazuo Nagatomo; Hirohisa Fujiyama, all of Sagamihara, Japan

[73] Assignee: Nippon Steel Corporation, Tokyo, Japan

[21] Appl. No.: 778,805

[22] PCT Filed: Apr. 17, 1990

[86] PCT No.: PCT/JP91/00505
§ 371 Date: Dec. 18, 1991
§ 102(e) Date: Dec. 18, 1991

[87] PCT Pub. No.: WO91/16167
PCT Pub. Date: Oct. 31, 1991

[30] Foreign Application Priority Data

Apr. 18, 1990 [JP] Japan .................. 2-100200

[51] Int. Cl.$^5$ ............................................. B23K 25/00
[52] U.S. Cl. ..................................... 219/54; 219/73.1
[58] Field of Search ........................... 219/53, 54, 73.1

[56] References Cited

U.S. PATENT DOCUMENTS 4,686,341  8/1987  Nomura et al. .................. 219/54
4,841,116  6/1989  Kimura et al. ................. 219/73.1

FOREIGN PATENT DOCUMENTS 44-24249  10/1969  Japan .
45-14173   5/1970  Japan .
45-19369   7/1970  Japan .
53-30942   3/1978  Japan .
61-249679  6/1986  Japan .
64-2779    6/1989  Japan .

Primary Examiner—Clifford C. Shaw
Attorney, Agent, or Firm—Pollock Vande Sande & Priddy

[57] ABSTRACT

In a method of automatically welding rails, welding of bottom portions of the rails is carried out as root pass welding of a first layer according to $CO_2$ gas shielded arc weld technique, and as continuous multilayer welding of layers above the first layer according to $CO_2$ gas shielded arc weld technique without discontinuing the welding of a second layer and upper layers. In welding of ankle portions (R2) of the rails, a flux is rapidly added to promptly shift to electroslag weld. Then, welding is conducted to head surfaces (R5) of the rails by continuing electroslag weld technique. This automatic welding method enables high efficiency field welding of rails, obviating the need for any complicated switching operation of the electric power source and use of several kinds of welding materials.

1 Claim, 4 Drawing Sheets

METHOD OF AUTOMATICALLY WELDING RAILS

TECHNICAL FIELD

The present invention relates to an automatic welding method used in performing of butt welding to rails of railroads or cranes.

BACKGROUND ART

A rail, as is apparent from the section thereof shown in FIG. 1, consists of a foot portion R1, an ankle portion R2, a web portion R3, a head portion R4 and a head top plane R5. To butt-weld rails by field facilities, conventionally thermite welding technique or enclosed arc welding technique is applied. In the enclosed arc wel technique, weling is continuously performed: a coated arc welding rod is used; multilayer welding is conducted on the rail foot portions R1; and then the web portions R3 and the head portion R4 are surrounded with enclosed block members.

However, any automatic fusion welding technique using a filler wire has been not yet placed into practice. In the thermite welding, (1) the performance of joints is poor, and is statistically liable to be broken during use, and (2) skill is necessary for operation. On the other hand, the enclosed arc welding technique has problems in that: (1) skill is needed for operation; (2) working environment is bad due to high preheat temperature; and (3) productivity is low. Thus, it is desired to develop an automatic fusion welding to be high efficiency and high performance without need for skill.

From the purpose of use of a rail, it is required to have quality of high wear resistance at the top plane R5 against rolling contact with wheels and resistance against fatigue cracks, that is, fatigue damage resistance. On the other hand, the foot portion R1, the web portion R3 and the head portion R4 are required to have static strength and fatigue strength to withstand impacts or bending loads during passing of wheels, and furthermore it is necessary to have no welding defect, such as weld cracks, or have a defect as little as possible so as to provide no problem in practical use.

Under these situations, various kinds of automatic fusion welding which will be able to replace for the thermite welding and the enclosed arc weld in the future have been studied. Techniques disclosed in Japanese Patent Examined Publications Nos. 44-24249 and 45-14173 were proposed as a method to replace the enclosed arc welding. According to the former technique, rail bottom portions are welded by the multilayer submerged arc welding, and rail web portions and head portions are welded by the electroslag welding. On the other hand, the latter performs welding over the whole sectional areas of the rails by the gas shielded arc welding. Also, techniques taught in Japanese Patent Examined Publications No. 45-19369 and Japanese Patent Unexamined Publication No. 61-249679 conduct a method of butt-welding rails using the gas shielded arc welding.

These above-mentioned prior art still have many problems in utility although the techniques do not need application of pressure in the rail axial direction, and in these techniques it is possible to enhance efficiency as compared to the enclosed arc welding.

More specifically, according to the former, welding is conducted while slag is removed during the submerge arc welding, welding is temporarily discontinued after the welding of the bottom portions is completed, and then welding is restarted to carry out the electroslag welding of the web and the head portions. Accordingly, it is likely that weld defects, such as lack of fusion and solidification cracks, take place each time when welding is started and stopped. Further, welding is deteriorated in efficiency. Furthermore, in the welding of the rail bottom portions and the web and the head portions, it is necessary to properly use welding materials (such as flux) and to switch characteristics of the welding power source. Thus, this method involves deterioration in efficiency due to complicated operation, cost up of the welding machine and complicated control of welding materials.

On the other hand, the latter method overcomes such defects, but in view of the technique being applied to field construction, it is inferior in that sufficient attention must be paid to wind resistance since a shield gas is used in the whole sectional areas of the rails. Particularly, it is very hard to perfectly shield the rail web portions to the rail head portions from wind in the field to thereby keep the gas shield effect properly, and even if possible, a complicated mechanism is needed and is not practical. Furthermore, the gas shielded arc welding is narrower in proper welding condition range to bevel size than the electroslag welding. Particularly, when layering of welding proceeds, in regions from the rial web portions to head portions there is a high possibility that weld defects, such as poor fusion, take place due to variation of bevel size, and hence it is liable to deteriorate reliability of the joint.

DISCLOSURE OF INVENTION

The present invention is proposed in view of the problems previous described of the prior art, and it is an object of the invention to provide a method of automatically welding rails, using $CO_2$ gas shielded arc weld technique as well as electroslag weld technique, the method being capable of achieving field welding of rails at a high efficiency from bottom portions to head portions of the rails, obviating the need for complicated operations.

To achieve the object above, the present invention provides a method of automatically welding rails, using both $CO_2$ gas shielded arc weld technique and electroslag weld technique, characterized in that: welding of bottom portions of the rails is carried out by root pass welding a first layer according to $CO_2$ gas shielded arc weld technique, and by continuous multilayer welding layers over the first layer according to $CO_2$ gas shielded arc weld technique without discontinuing the welding; welding of ankle portions of the rails is conducted by rapidly adding a special flux of low melting point and low viscosity at an adding speed of 200 g/min to 1 kg/min to thereby promptly shift to electroslag weld; then, welding is conducted to head surfaces of the rails by continuing electroslag weld technique; during these continuous welding operations, $CO_2$ gas and the flux are automatically supplied using a frame type stationary block, an outer sleeve of a nonconsumable electrode nozzle, and a like member which are placed on upper surfaces of the rail bottom portions while a slag and a molten metal are prevented from flowing out; and welding is conducted, using a d.c. current source having a constant voltage characteristic, a welding filler wire having a radius 1.2 to 2.0 mm, and a fused type flux of a low melting point and a low viscosity.

BEST MODE FOR CARRYING OUT THE INVENTION

One embodiment of the present invention will be described in detail hereinafter with reference to the drawings.

Figure 3:
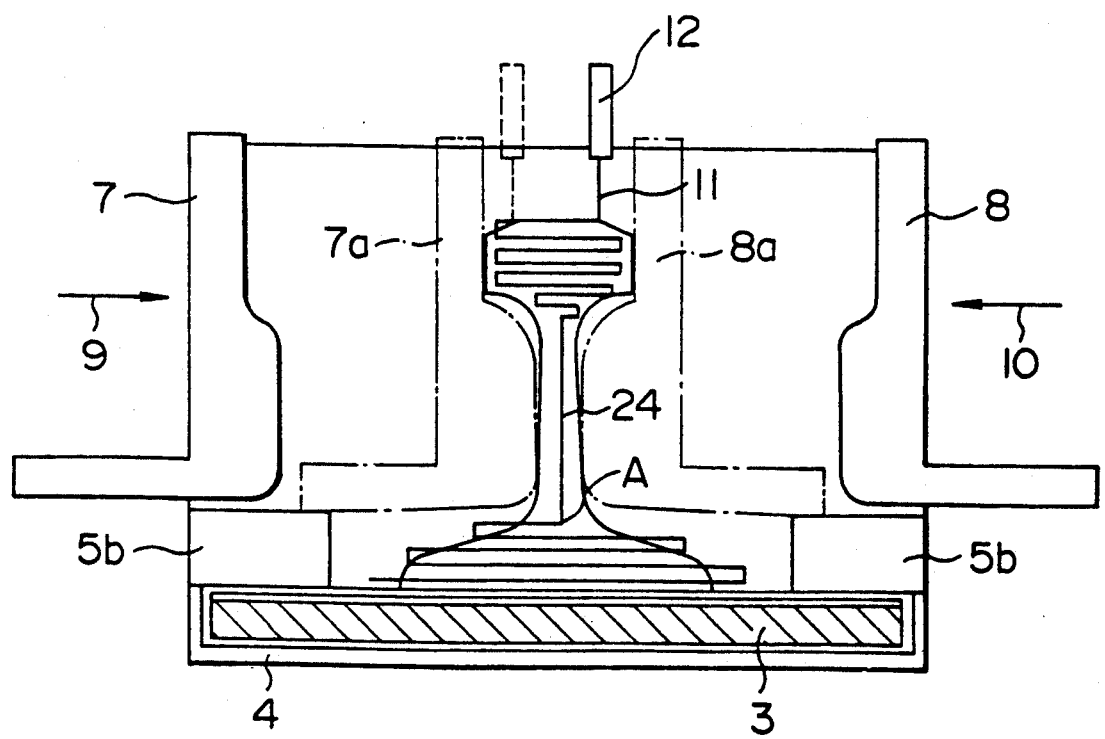
FIG. 3 is a partial front view in section of FIG. 2.
Figure 2:
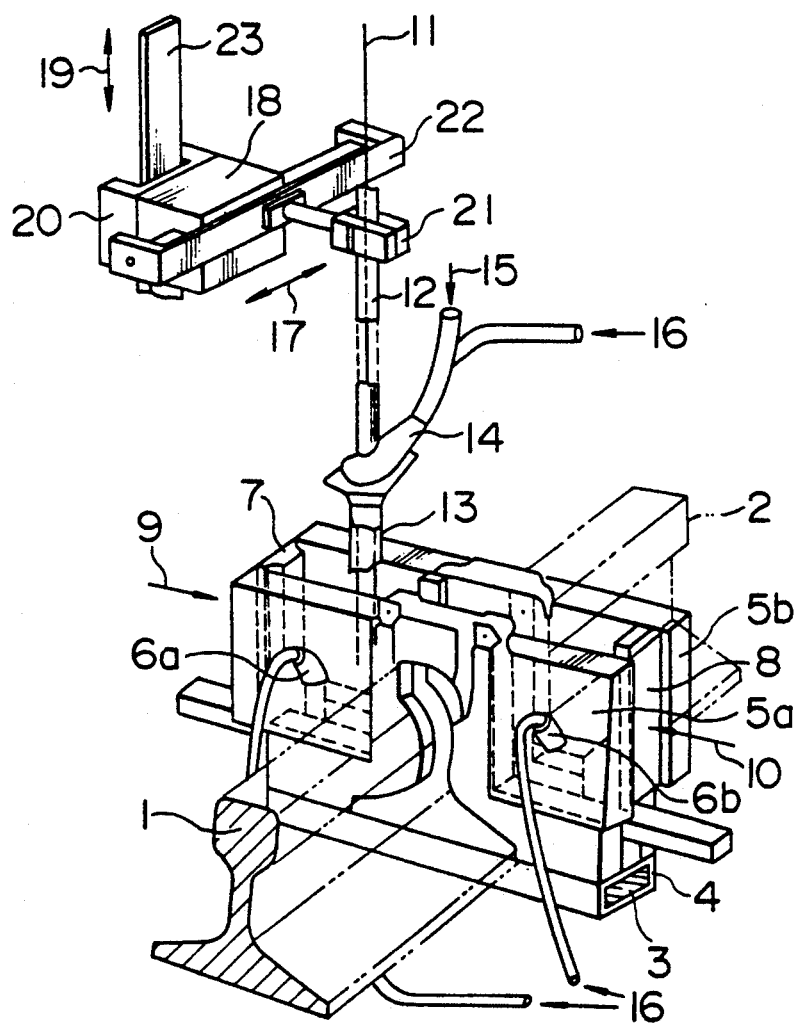
FIG. 2 is a perspective view for illustrating a mode of application of the present invention.

FIG. 2 is a perspective view showing a mode of application of the present invention. FIG. 3 is a side view of the application mode as viewed from one end of one rail to be welded.

Figure 1:
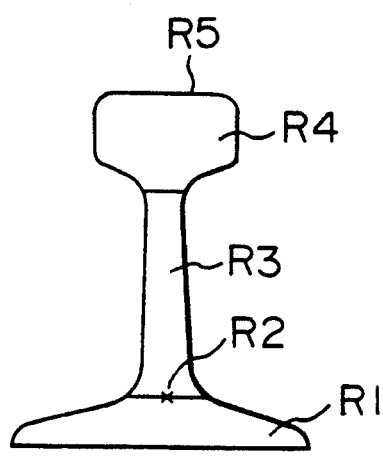
FIG. 1 is a sectional view of a rail.

In FIG. 2, 1 and 2 designate rails which are members to be welded, and end faces thereof are placed in abutment to each other with an appropriate bevel gap therebetween. 3 denotes a backing member which is lined to the bottoms of the rails, and the backing member is disposed within a backing member receiving case 4, and is used for forming root pass beads. 5a and 5b denote frame type stationary copper shoes which are previously placed tightly to surround the grooved portion of the rails before welding is started, and are connected to the backing member receiving case 4 for preventing molten metal from flowing outside in welding of bottom portions of the rails. The blocks are also used as wind shield walls and gas shield boxes. Members 6a and 6b attached to the member 5a are shield gas supply nozzles.

Next, 7 and 8 designate movable copper shoes, and are slid in the gap between the stationary copper shoes 5a and 5b in the directions of arrows 9 and 10 by appropriate drive means (not shown), such as a hydraulic drive mechanism to make a close contact with side surfaces of rail web and head portions after the welding of rail bottom portions is completed, thereby preventing a slag and a molten metal from flowing outside during electroslag weld which is conducted for webs and portions higher than the webs of the rails. 11 indicates a filler wire, and 12 a torch for guiding the filler wire 11 to within the beveling as well as supplying electric power to the filler wire 11. The torch 12 is covered with a consumable outer sleeve 13, which has a construction capable of supplying a fusion type flux 15 and a $CO_2$ shielded gas 16 to a distal portion (arc point) of the filler wire through a branching port 14 simultaneously or separately. Furthermore, the torch 12 is held by an oscillator 18 and a carriage 20 through a holder 21 and a connecting plate 22. The oscillator 18 has a moving shaft horizontally moving in the direction of the arrow 17, and the carriage 20 is moved in the direction of the arrow 19. 23 designates a guide rail of the carriage 20.

With such a construction, welding is conducted while the distal end portion of the filler wire 11 draws a locus as shown by 24 in FIG. 3. The movable copper shoes 7 and 8 are positioned at 7a and 8a, respectively, after the welding reaches webs of the rails, that is, after the point A of the locus 24.

The construction of the mode of application of the method of the present invention has been described above.

Figure 4:
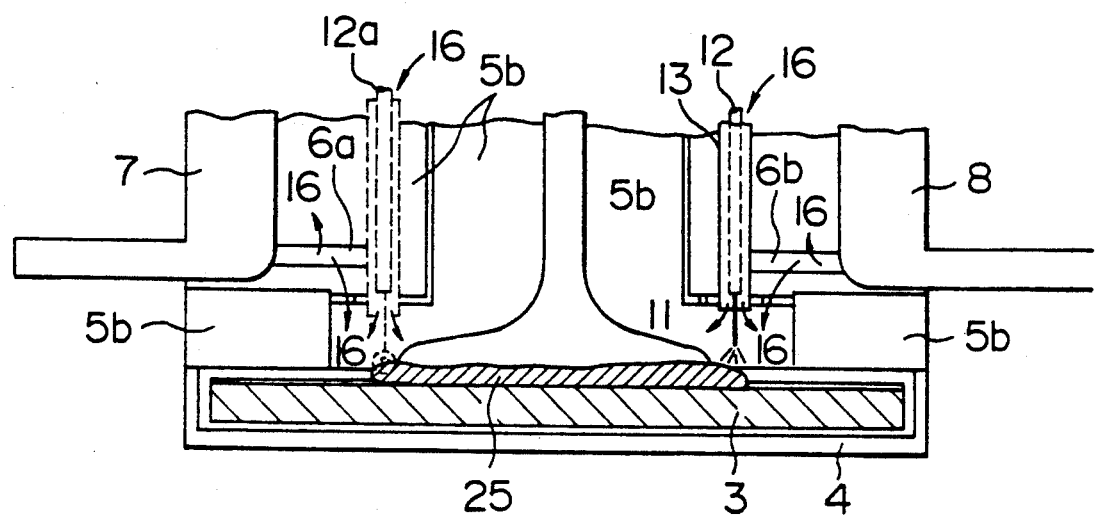
FIG. 4 is a sectional view illustrating welding of a first layer of rail bottom portions according to the present invention.

Nextly, referring to FIGS. 4 to 6, the method of the present invention will be described in more detail, following a welding process.

The conditions of the root pass welding will be described according to the schematic view of FIG. 4, in which the $CO_2$ shielded gas 16 which directly shields arcs is supplied through the consumable outer sleeve 13 fitted around the torch 12. To perfectly achieve the shield effect, the $CO_2$ shielded gas 16 which replaces the atmospheric air around the whole rail bottom portions to be welded is supplied from supply nozzles 6a and 6b provided to the frame stationary copper shoe 5a. That is, this welding is characterized in that the $CO_2$ gas shielded arc weld of the rail bottom portions is carried out by double shield mechanism. The welding is conducted by moving the welding torch from the position 12a to the right in FIG. 4. As the welding proceeds, also the backing member 3 becomes partly molten, and hence the bottom surface of an first layer bead 25 is covered with a thin slag to thereby smooth the shape of the bead. As this backing member 3 a sintered solid ceramic which has a relatively high heat resistance is used through a glass tape for preventing the excess weld metal of the root bead from becoming excessively large even in the case where the beveling of the article to be welded is in the shape of I and thus has a relatively wide root gap (14 to 22 mm). This technique provides the most preferable welding.

Referring to the schematic view of FIG. 5, welding after welding of the first layer of the rail bottom portions will be described. Welding is performed by $CO_2$ gas shielded arc weld as in the first layer. In the schematic view of FIG. 5, welding of the rail bottom portions proceeds to a fifth layer and is in a situation near the completion thereof.

In the figure, 26 designates a bead formed after the first layer, and 7b and 8b moving copper shoes for welding webs and heads, respectively. After the first layer welding illustrated on FIG. 4, welding of the second layer is conducted by reversing the moving direction of the torch 12 without discontinuing the welding. In this event, crater treatment is performed by decreasing the current and the welding speed at the welding turning end portion. In this manner, the welding of the rail bottom portions proceeds by repeating reciprocal movement of the torch 12. It is to be noted that it is possible to prevent excess weld metal from becoming excessively large by reducing the horizontal traveling distance of the torch 12 every reciprocal movement. When the welding of the rail bottom portions is substantially completed, the moving copper shoes 7 and 8 are promptly moved to positions 7b and 8b in FIG. 5 for preparation to perform welding of the rail web portions and welding after the latter.

Figure 6:
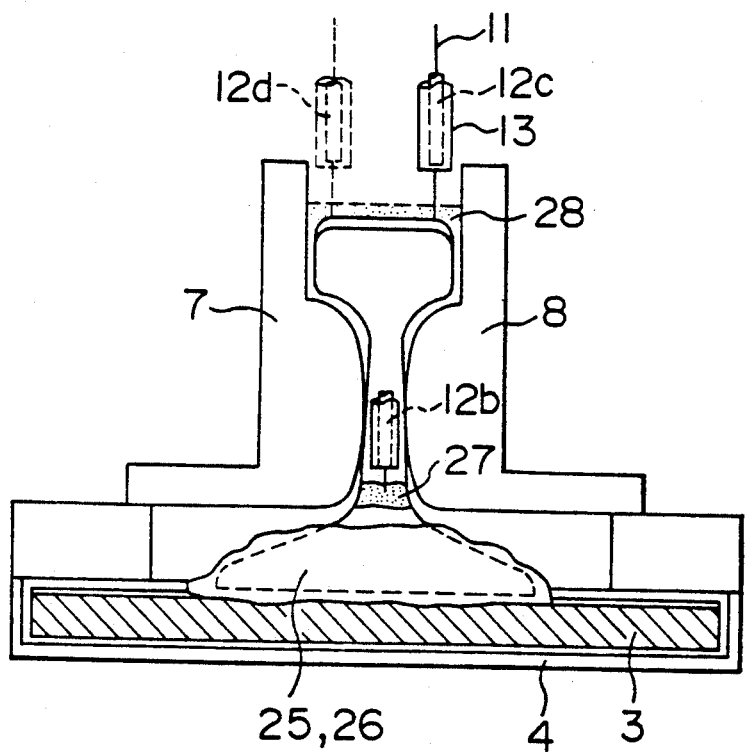
FIG. 6 is a sectional view illustrating welding of web portions and head portions of rails.

Now, welding of rail web portions and head portions will be illustrated on the basis of the schematic diagram of FIG. 6, in which 12b designates the situation of the torch during welding of the rail web portions and 27 a slag pool. On the other hand, 12c and 12d indicate situations of the torch during welding of rail head portions, and 28 a slag pool at that event. The welding of the rail head portions is performed by repeating horizontal movement of the torch position between the 12c and 12d. The copper shoes 7 and 8 are urged against the rails to make an intimate contact, so that the blocks prevent the slag and the molten metal from flowing out, and performs shaping of the bead.

Figure 5:
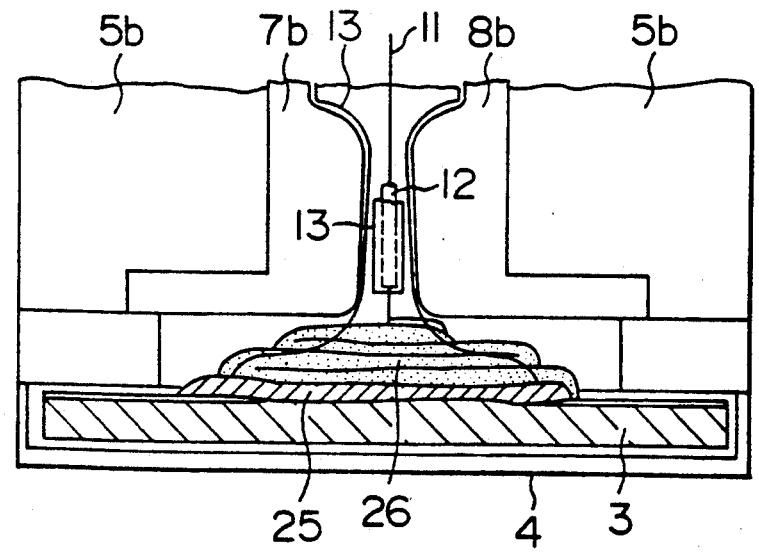
FIG. 5 is a sectional view showing welding of layers over the first layer of rail bottom portions according to the present invention.

After the $CO_2$ gas shielded arc weld of the rail bottom portions described referring to FIG. 5, horizontal travelling of the torch 12 is stopped at the center of the width of the rails, the supply of $CO_2$ gas 16 is stopped, the molten slag pool 27 is formed by rapidly feeding the flux 15, and electroslag weld of the rail web portions is started by moving the torch 12 only upwardly. When welding is completed at the rail web portions, and proceeds to the head portions, the horizontal travelling of the torch is recommenced. The distance of the horizontal movement is gradually increased, and welding is conducted by making reciprocal horizontal movement of a distance equal to the width of the rail heads, that is, between the torch positions 12c and 12d. In the electroslag weld from the rail web portions to the head portions, welding is conducted while the flux is fed to compensate for decrease of the depth of the slag pool.

In the method of the present invention, the inventors have studied the welding power source, the diameter of the welding wire, the type of the welding flux, etc from both sides of welding workability and weld joint performance. As a result it has been found that: to conduct excellent root pass welding at rail bottom portions by the $CO_2$ gas shielded arc weld, small diameter wire may be used to ensure current density; when welding is carried out by feeding a wire at a constant speed, using a d.c. power source of constant voltage characteristic as the welding power source, excellent welding can be achieved with a small diameter wire even if welding is switched to the electroslag weld as well as the $CO_2$ gas shielded arc weld; when the $CO_2$ gas shielded arc weld is switched to the electroslag weld, it is necessary to produce an appropriate depth of slag pool by instantaneously fusing the welding flux added; and a low melting point and low viscosity fused type flux is suitable for the flux, the flux containing major components of $CaF_2$—$SiO_2$—$TiO_2$: 25 to 40 wt. % of $CaF_2$; 20-35 wt. % of $SiO_2$; and 5-15 wt. % of $TiO_2.CaF_2+SiO_2$ being contained at an amount of more than 50 wt. %.

Below 25% of $CaF_2$ and below 20% of $SiO_2$, the produced slag is excessively high in viscosity and melting point, so that the shift to the electroslag weld is not smoothly made, resulting in unstable welding. In the case where the amount of $CaF_2$ is beyond 40%, fluoride gas is excessively generated, with the result in deterioration of the working environment, and this is not permissible. Beyond 35% of $SiO_2$, fire resistance is deteriorated, the shape of the welding bead becomes unstable, and the slag is liable to leak, resulting in unstable welding since the slag is deteriorated in viscosity. The total of $CaF_2$ and $SiO_2$ must be more than 50%. Below 50%, it becomes hard to shift from the $CO_2$ gas shielded arc weld to the electroslag weld. $TiO_2$ is used to keep the slag appropriately in electric conductivity in combination with $CaF_2$ in the electroslag weld but below 5%, there is no effect while beyond 15% the melting point becomes high, so that it takes much time to shift from the $CO_2$ gas shielded arc weld to the electroslag weld, resulting in that there is a liability that weld defects may be produced.

To smoothly shift from the $CO_2$ gas shield arc weld to the electroslag weld at rail foot portions, adding speed of the flux is also important. In the case of a low speed smaller than 200 g/min, it takes much time to produce a proper depth of the slag pool, and the welding hence becomes unstable. On the other hand, in the case of a high speed addition beyond 1 kg/min, the fusion of the flux cannot follow, and hence a defect including infused flux take place. Thus, the range of the proper flux adding speed is over 200 g/min and below 1 kg/min.

When the wire has a diameter smaller than 1.2 mm, the arc is too small in both force and extent to properly conduct first layer root pass welding of rail bottom portions even if current is set to the upper limit of the proper current range, and hence the wire diameter is not permissible. On the other hand, with a wire diameter larger than 2.0 mm, current becomes excessively large to conduct welding at a proper current density, and hence a large capacity of power source is needed. This make it hard to apply the present invention to field welding. For this reason, a wire diameter in the range of 1.2 to 2.0 mm is optimal.

Examples in which according to the construction and procedures previously mentioned railway rails 1321b were butt-welded will be given. Examples 1 to 4 conduced according to the present invention and Comparative Tests 1 and 2 are given. In Examples 1 to 4, high efficient welding was favorably conducted without any defects. In Comparative Test 1, the flux addition speed fell outside the present invention, and when welding was shifted to electroslag weld, the electroslag state could not be smoothly attained and welding of rail web portion shift could not be conducted. In Comparative Test 2, the flux composition fell outside the present invention, and as in the above case, smooth shift to the electroslag weld could not be achieved and welding was discontinued.

EXAMPLE 1

| | |
|---|---|
| Welding wire: | φ 1.6 mm solid wire |
| Flux: | fusion type flux $CaF_2$ 35%, $TiO_2$ 10%, CaO 20% and $SiO_2$ 30% |
| Flux adding speed: | 450 g/min |
| Backing: | a glass tape (1 mm) + a ceramic solid material (10 mm) |
| Welding power supply: | a d.c. constant voltage characteristic power supply, rating 500 A |

TABLE 1

Welding Conditions

| Welding portions | Welding current (Amp.) | Welding voltage (Volt) | Torch ascending speed | Welding speed (cm/min) Torch traversing speed |
|---|---|---|---|---|
| Bottom portion | | | | |
| first layer | 420 | 39 | — | 14 |
| second layer | 300 | 38 | — | 10 |
| 3rd-5th layer | 320 | 38 | — | 12 |
| Web portion | 380 | 40 | 6 | — |
| Head portion | 380 | 40 | 1.5 | 25 |

Note: bevel gap 16 mm

EXAMPLE 2

| | |
|---|---|
| Welding wire: | φ 1.6 mm solid wire |
| Flux: | fusion type flux $CaF_2$ 35%, $TiO_2$ 7%, CaO 25% and $SiO_2$ 25% |
| Flux adding speed: | 200 g/min |
| Backing: | a glass tape (1 mm) + a ceramic solid |

-continued

| | |
|---|---|
| | material (10 mm) |
| Welding power supply: | a d.c. constant voltage characteristic power supply, rating 500 A |

TABLE 2

Welding Conditions

| Welding portions | Welding current (Amp.) | Welding voltage (Volt) | Welding speed (cm/min) | |
|---|---|---|---|---|
| | | | Torch ascending speed | Torch traversing speed |
| Bottom portion | | | | |
| first layer | 400 | 38 | — | 12 |
| second layer | 320 | 36 | — | 12 |
| 3rd–5th layer | 350 | 40 | — | 15 |
| Web portion | 400 | 38 | 6 | — |
| Head portion | 400 | 38 | 1.5 | 20 |

Note: bevel gap 18 mm

EXAMPLE 3

| | |
|---|---|
| Welding wire: | φ 1.2 mm solid wire |
| Flux: | fusion type flux CaF$_2$ 40%, TiO$_2$ 12%, CaO 18%, SiO$_2$ 25% and MgO 5% |
| Flux adding speed: | 1000 g/min |
| Backing: | a glass tape (1 mm) + a ceramic solid material (10 mm) |
| Welding power supply: | a d.c. constant voltage characteristic power supply, rating 500 A |

TABLE 3

Welding Conditions

| Welding portions | Welding current (Amp.) | Welding voltage (Volt) | Welding speed (cm/min) | |
|---|---|---|---|---|
| | | | Torch ascending speed | Torch traversing speed |
| Bottom portion | | | | |
| first layer | 360 | 34 | — | 12 |
| second layer | 270 | 31 | — | 8 |
| 3rd–5th layer | 340 | 36 | — | 16 |
| Web portion | 350 | 35 | 4 | — |
| Head portion | 350 | 35 | 1.0 | 30 |

Note: bevel gap 15 mm

EXAMPLE 4

| | |
|---|---|
| Welding wire: | φ 2.0 mm solid wire |
| Flux: | fusion type flux CaF$_2$ 40%, TiO$_2$ 15%, CaO$_2$ 10%, SiO 22% and MgO 5% |
| Flux adding speed: | 700 g/min |
| Backing: | a glass tape (1 mm) + a ceramic solid material (10 mm) |
| Welding power supply: | a d.c. constant voltage characteristic power supply, rating 500A |

TABLE 4

Welding Conditions

| Welding portions | Welding current (Amp.) | Welding voltage (Volt) | Welding speed (cm/min) | |
|---|---|---|---|---|
| | | | Torch ascending speed | Torch traversing speed |
| Bottom portion | | | | |
| first layer | 480 | 46 | — | 15 |
| second layer | 360 | 40 | — | 11 |
| 3rd–5th layer | 380 | 42 | — | 16 |
| Web portion | 420 | 42 | 7 | — |
| Head portion | 420 | 42 | 2.0 | 30 |

Note: bevel gap 20 mm

COMPARATIVE TEST 1

| | |
|---|---|
| Welding wire: | φ 1.6 mm solid wire |
| Flux: | fusion type flux CaF$_2$ 34%, TiO$_2$ 8%, CaO 24% and SiO$_2$ 30% |
| Flux adding speed: | 160 g/min |
| Backing: | a glass tape (1 mm) + a ceramic solid material (10 mm) |
| Welding power supply: | a d.c. constant voltage characteristic power supply, rating 500 A |

TABLE 5

Welding Conditions

| Welding portions | Welding current (Amp.) | Welding voltage (Volt) | Welding speed (cm/min) | |
|---|---|---|---|---|
| | | | Torch ascending speed | Torch traversing speed |
| Bottom portion | | | | |
| first layer | 400 | 38 | — | 12 |
| second layer | 310 | 38 | — | 12 |
| 3rd–5th layer | 330 | 38 | — | 14 |
| Web portion | — | — | — | — |
| Head portion | — | — | — | — |

Note: bevel gap 17 mm

COMPARATIVE TEST 2

| | |
|---|---|
| Welding wire: | φ 1.6 mm solid wire |
| Flux: | fusion type flux CaF$_2$ 15%, TiO$_2$ 25%, CaO$_2$ 10%, SiO$_2$ 15%, and AlO$_2$ 30% |
| Flux adding speed: | 400 g/min |
| Backing: | a glass tape (1 mm) + a ceramic solid material (10 mm) |
| Welding power supply: | a d.c. constant voltage characteristic power supply, rating 500 A |

TABLE 6

Welding Conditions

| Welding portions | Welding current (Amp.) | Welding voltage (volt) | Welding speed (cm/min) | |
|---|---|---|---|---|
| | | | Torch ascending speed | Torch traversing speed |
| Bottom portion | | | | |
| first layer | 400 | 38 | — | 12 |
| second layer | 320 | 36 | — | 12 |
| 3rd–5th layer | 350 | 39 | — | 15 |
| Web portion | — | — | — | — |

TABLE 6-continued

| | Welding Conditions | | | |
| --- | --- | --- | --- | --- |
| | | | Welding speed (cm/min) | |
| Welding portions | Welding current (Amp.) | Welding voltage (volt) | Torch ascending speed | Torch traversing speed |
| Head portion | — | — | — | — |

Note: bevel gap 16 mm

Welding was conducted on the conditions above mentioned. In Examples 1 to 4, welding could be carried out in about ten and several minutes except preparation and aftertreatment, and high efficiency welding without defect was conducted.

In field welding of rails according to the present invention, it is, as previously described, possible to conduct welding from rail bottoms to head portions at a high efficiency by using $CO_2$ gas shielded arc welding technique as well as electroslag welding technique without performing complicated power switching and without using kinds of welding materials.

INDUSTRIAL APPLICABILITY

The method of automatic welding rails according to the present invention may be applied to rails, such as of railways and traveling cranes, with field facilities. This automatic welding method may be continuously applied to bottoms, webs, top surfaces of rails by using $CO_2$ gas shielded arc welding technique as well as electroslag welding technique.

We claim:

1. In a method of automatically welding rails, using both $CO_2$ gas shielded arc weld technique and electroslag weld technique, characterized in that:

welding of bottom portions of the rails is carried out as root pass welding of a first layer according to $CO_2$ gas shielded arc weld technique, and as continuous multilayer welding of layers above the first layer according to $CO_2$ gas shielded arc weld technique without discontinuing after the welding of the first layer;

welding of leg portions of the rails is conducted by rapidly adding a flux at an adding speed of over 200 g/min and below 1 kg/min to thereby promptly shift to electroslag weld;

then, welding is conducted to head surfaces of the rails by continuing electroslag weld technique;

during these continuous welding operations, $CO_2$ gas and the flux are automatically supplied using copper shoes and an outer sleeve of a nonconsumable electrode nozzle while a slag and a molten metal are prevented from flowing out; and d.c. current having a constant voltage characteristic, a welding filler wire having a radius 1.2 to 2.0 mm, and as the flux a low melting point and low viscosity fused type flux are used, the flux containing major components of $CaF_2$—$SiO_2$—$TiO_2$: 25 to 40 wt. % of $CaF_2$; 20-35 wt. % of $SiO_2$; and 5-15 wt. % of $CaF_2$+$SiO_2$ being contained at an amount of at least 50 wt. %.

* * * * *